Sept. 13, 1949.   W. E. MESH   2,481,858
RAIL FLAW DETECTOR MECHANISM
Filed March 2, 1948   2 Sheets-Sheet 1
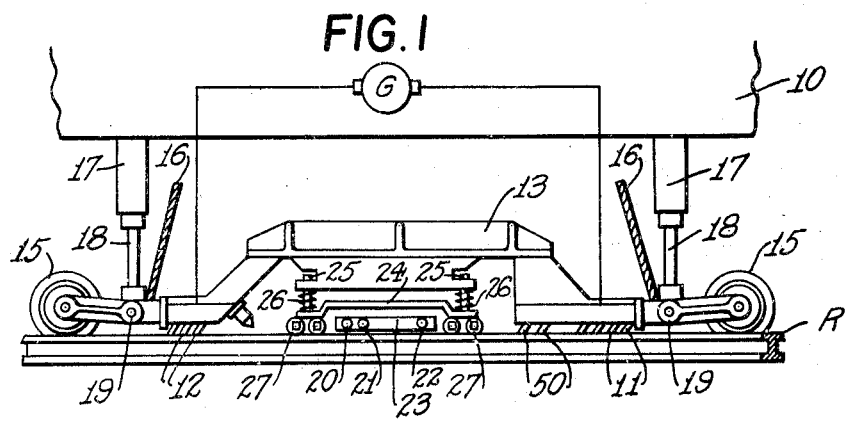
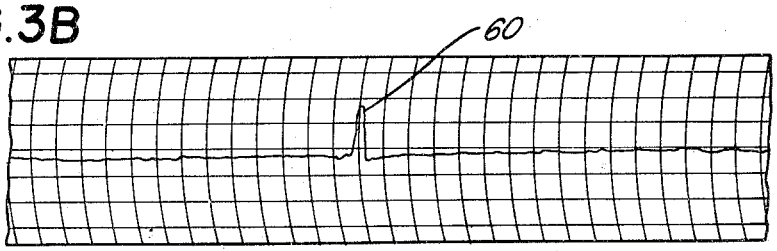
INVENTOR
WILLIAM E. MESH
BY
Joseph H. Lipschutz
ATTORNEY Patented Sept. 13, 1949

2,481,858

UNITED STATES PATENT OFFICE 2,481,858

RAIL FLAW DETECTOR MECHANISM

William E. Mesh, Teaneck, N. J., assignor to Sperry Products, Inc., Hoboken, N. J., a corporation of New York Application March 2, 1948, Serial No. 12,531

2 Claims. (Cl. 175—183)

This invention relates to rail flaw detector mechanisms such as now employed on the Sperry rail flaw detector cars. These cars run along the railroad tracks and pass current continuously through the rails between spaced contact brushes to set up an electro-magnetic field surrounding the rail. Flaws in the rail caused by fissures are discovered by reason of the fact that they set up non-uniform regions in the said electro-magnetic field. Such non-uniformities are detected by means such as opposed induction coils maintained at a constant distance above the railhead, the coils normally cutting a constant number of lines of force, but on encountering a region of flaw they cut a different number of lines of force to generate a differential E. M. F. which, after being suitably amplified, may be caused to operate indicating means. Such indicating means may take the form of one or more pens operating on a moving chart within the car, and also the deposit of paint on the rail in the region of flow by reason of the simultaneous operation of a paint gun. It will be understood that rail joints which consist of angle bars, bolts, and so forth, serving to connect the adjacent rail ends will also cause non-uniformity in the electromagnetic field surrounding the rail, and unless means were provided for taking care of this situation, such variation in field caused by the angle bar would affect the detector mechanism in the same manner as an internal fissure, and moreover, would actuate the detector mechanism throughout the entire passage of the mechanism over the angle bar. To prevent such response of the detector mechanism to the entire region of the angle bar, the patent to H. C. Drake, No. 2,069,030, for Rail fissure detector, granted January 26, 1937, discloses a joint cut-out mechanism for the purpose of cutting out the operation of the detector mechanism during the interval that the detector mechanism is passing over an angle bar. The means there employed consist of a plurality of fingers which extend below the railhead on the gage side thereof so that normally the fingers are free of engagement with the rail, but when an angle bar is approached, the fingers will successively be rocked about their pivots to cause the detector mechanism to be rendered ineffective.

The use of pivoted fingers for the purpose of responding to the angle bar has been found to be accompanied by difficulties, such as the mechanical damage to the fingers necessitating replacement and continuous readjustment and realignment. Also these fingers extending below the railhead engage other objects besides the angle bar such as, for example, spikes, road crossings, high ballast, snow and ice, all of which cause the joint finger to be swung around its pivot to actuate the joint cut-out mechanism when such actuation is not wanted. It has therefore been proposed to provide a joint responsive mechanism which does not consist of pivoted members extending below the railhead, but rather comprises a pair of potential contacts adapted to slide on the railhead and to actuate the cut-out mechanism in response to the relatively large increase in voltage which occurs at the meeting ends of the rail. Such joint responsive mechanism is disclosed in my co-pending application Serial No. 650,661 filed February 27, 1946, now Patent No. 2,467,328, issued April 12, 1949.

The use of a joint responsive mechanism in the form of a pair of contacts in sliding engagement with the railhead is attended by several major problems. One of these is the fact that contact voltages generated between each contact and the rail yield voltage outputs which are of the same order as the voltage drop between the contacts at a joint, and therefore can cause false actuation of the cut-out mechanism. This problem was solved in my co-pending application by providing a coupling transformer with low impedance primary between the pair of contacts and the cut-out mechanism whereby the contact voltages, being of high internal impedance, did not generate sufficient voltage across the low impedance external circuit to actuate the cut-out mechanism, whereas, the potential drop across the rail ends, being of low internal impedance, did generate a voltage across the external circuit sufficient to actuate the cut-out mechanism.

However, still another problem exists in this type of joint responsive means for actuating the cut-out mechanism. The latter problem arises because of the fact that the main current brushes which send current through the rail make variable contact with the rail and frequently lose contact momentarily because of dirt, oxide, and other foreign substances on the rail surface. Such momentary loss of contact causes sparking, and, therefore, generates a high frequency oscillation causing a corresponding variable high frequency voltage pickup by the potential contacts. Such voltages are of an order comparable to that encountered by the contacts across the rail ends and would therefore cause actuation of the cut-out mechanism.

It is therefore one of the principal objects of this invention to provide a method and means for distinguishing between the voltage drop picked up by the contacts across the rail ends from the potential drop generated when the main current brushes lose contact and cause sparking. More particularly, the invention relates to a method and means for eliminating from the output of the pair of contacts the undesired high frequency oscillations.

Further objects and advantages of this invention will become apparent in the following detailed description thereof.

In the accompanying drawings,

Fig. 1 is a side view of a portion of a Sperry rail fissure detector car having my invention applied thereto.

Figs. 3A and 3B are portions of record tapes illustrating the output from the contacts before and after applying my invention thereto.

Figure 2:
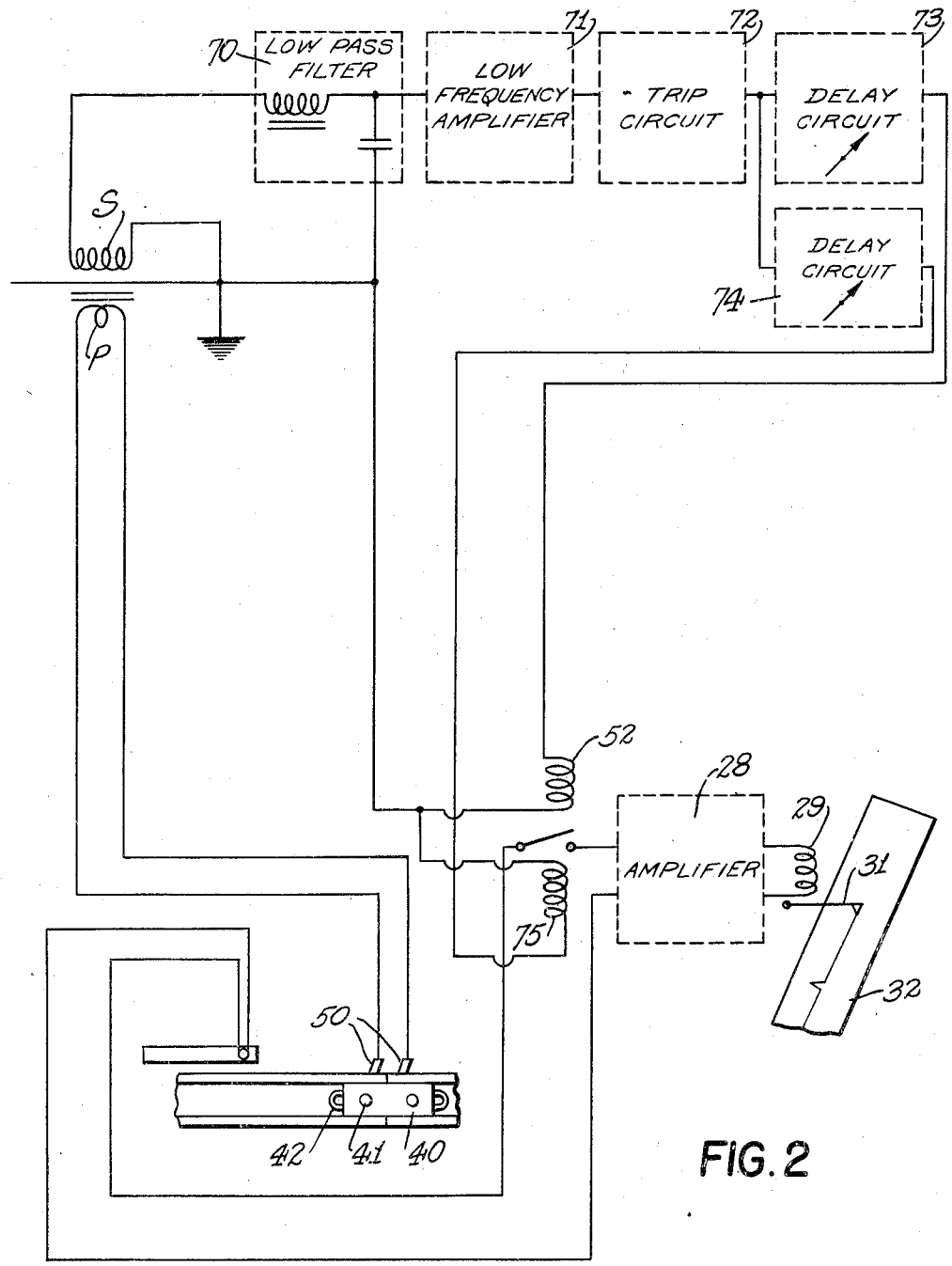
Fig. 2 is a wiring diagram illustrating the principle of this invention.

Referring to Fig. 1 of the drawings, there are shown the parts of a standard Sperry rail fissure detector car which includes a car body 10 operating along the rails R. Fissure detection is accomplished by passing current through each rail from a generator G within the car body supplying current to spaced current brushes 11 and 12 supported upon the current brush carriage 13 which, when in lowered or effective position is adapted to ride upon the rail by means such as wheels 15. The current brush carriage 13 is normally held in elevated or ineffective position by means of springs (not shown) and cables 16, but when it is desired to lower said carriage, fluid pressure such as compressed air is applied to the cylinders 17 to force out pistons 18 which are pivotally connected at 19 to the current brush carriage 13. The current passed through the rail by way of spaced brushes 11 and 12 will establish an electro-magnetic field surrounding the rail and this field will be uniform except in the region of flaw where it will be distorted. Such distortions of the electro-magnetic field are detected by a flaw responsive mechanism which may take the form of a plurality of induction coils 20, 21, 22 supported in a housing 23 at a constant distance above the rail surface by means of a carriage 24. Said carriage 24 is mounted on current brush carriage 13 by means of loosely fitting bolts 25 and springs 26 to permit said carriage 24, while riding on the rail on means such as wheels 27, to move independently of carriage 13 so that said carriage may at all times maintain parallelism with the rail surface regardless of irregularities thereof. The flaw responsive mechanism may include one or more pairs of coils, three such pairs 20, 21, 22 being shown in the present instance. Each pair of coils is connected in series and oppositely wound so that variations in flux which affect both simultaneously, such as variations in the current supply or equal variations in the distance of the coils above the rail, will affect both equally and oppositely, and thus will not affect the flaw detection. On entering a region of flaw, however, first one and then the other of said coils will cut a different number of lines of force from that which was previously cut to generate a differential E. M. F. These E. M. F.'s, after being amplified by an amplifier 28, will energize a relay 29 to actuate a pen 31 which operates on a moving chart 32. A notch 33 thus formed in the straight line being drawn by the pen indicates the presence of a flaw.

As stated in the introduction to this specification, a joint (see Fig. 2) comprising angle bars 40, a plurality of bolts 41, and bond wires 42, will distort the electro-magnetic field surrounding the rail in the same manner as a fissure and throughout the entire passage of the detector mechanism over the joint, indications would be coming through on the chart, causing continuous actuation of the pens, thus obscuring the chart and making it difficult to read. This is particularly dangerous with respect to actual fissures existing near the angle bars because it would be impossible to distinguish such a pen indication from the plurality of pen indications immediately adjacent thereto and caused by the joint construction. For this reason in the said prior Patent No. 2,069,030, there were provided a pair of spaced fingers mounted on the current brush carriage 11 in advance and to the rear of the detector coils within the housing 23. These fingers were adapted to engage the angle bar when the detector coil approached the region where the angle bar began to distort the electro-magnetic field and controlled a circuit which rendered the indicating mechanism ineffective while the detector mechanism was passing over the angle bar. The rear finger engaged said angle bar before the leading finger passed beyond the angle bar so that the circuit through the indicating mechanism remained ineffective until the rear finger passed over the angle bar.

The use of the joint fingers for this purpose gives rise to difficulties for the reasons fully stated in the introduction hereto, and therefore in my said co-pending application, Serial No. 650,661, I provide as a joint responsive means a pair of potential contacts 50 in sliding engagement with the upper or tread surface of the rail. The drop in voltage between contacts 50 at portions of the rail other than the end is relatively slight in comparison to the drop in voltage across the rail ends. This sharp difference in potential is caused to actuate a relay 52, by means to be described hereinafter, to open the circuit between the detector coils and amplifier 28 so as to render the indicating mechanism ineffective.

As described in my said co-pending application, one of the difficulties experienced in the use of a pair of potential contacts such as 50 is the generation of contact voltages between each contact and the rail. Such contact voltages act in the same manner as the voltage drop across the rail ends and thus can cause false actuation of the joint cut-out mechanism. To obviate this difficulty, I take advantage of the fact that the contact voltage generated between each contact and the rail is of relatively high internal impedance which will not generate sufficient voltage across the low impedance external circuit to actuate the cut-out mechanism. The voltage drop between the contacts 50 at a joint is of low internal impedance so that there will be generated across the external circuit a voltage sufficient to actuate the cut-out mechanism. Therefore, I connect the potential contacts in a low impedance circuit comprising a primary winding P of a transformer characterized by very low impedance. Accordingly, there results a relatively low IR drop across the impedance in response to the contact voltages generated between a contact 50 and the rail because of the relatively high internal impedance. Therefore, the potential across low impedance P under these conditions is small. On the other hand, since the internal impedance between contacts 50 across the rail ends is relatively low, the IR drop across impedance P will be high. Hence, the voltage drop between contacts 50 across the rail ends will generate a voltage sufficient to actuate the relay 52, whereas, the voltage generated across the impedance P by the contact voltages between each contact 50 and the rail will be insufficient to actuate relay 52. The voltage applied to primary P induces voltage in secondary S to operate relay 52 by means to be described hereinafter. The low impedance primary P thus solves one of the difficulties in the use of potential contacts, i. e., the prevention of actuation of the cut-out mechanism by contact voltages rather than by the voltage drop across the rail ends. As stated in the introduction hereto, still another problem exists caused by the fact that the current brushes 11 and 12 frequently lose contact momentarily with the rail as said brushes pass over bits of scale, dirt, and so forth. Such loss of contact causes sparking which is a source of high frequency oscillation and such high frequency variation in voltage is of course picked up by contacts 50. Since these oscillations may be at times of the same magnitude as the voltage drop between contacts 50 at the rail end, there is obtained output voltages which can result in false actuations of the cut-out mechanism. Thus, by referring to Fig. 3A, there is shown on a voltage recorder tape the output voltages from contacts 50 in response to the voltage drop at the rail ends as well as at all other times. The voltage drop at the rail ends is shown at 60, but it will be seen that there are high frequency voltage outputs such as 61 and 62 caused by sparking between the main current brushes and the rail which are of the same general magnitude as the output 60 across the rail ends. The problem therefore is to distinguish between these two types of voltage picked up by the potential contacts 50 and to provide means whereby only the output 60 caused by the rail ends will actuate the joint cut-out mechanism while such outputs as 61 and 62 caused by sparking of the brushes will not affect the cut-out mechanism.

To solve the above problem I take advantage of the fact that the voltages generated by the momentary loss of contact between the main current brushes 11 and 12 and the rail are high frequency oscillations on the order of 1,000 cycles or more per second, while the voltages generated by the contacts 50 passing the rail ends can be made on the order of 20 to 30 cycles per second. In order to obtain the low frequency response at the rail ends, I take advantage of the fact that the further apart contacts 50 are spaced, the lower will be the frequency, while spacing them closely together raises the frequency in relation to the car speed. I, therefore, move the contacts 50 apart to such degree that the frequency of the voltage response when these contacts pass over the rail ends during the normal travel of the detector car is on the order of 20 to 30 cycles. Therefore, I pass the output from the secondary S of the transformer through a band-pass filter 70 designed to pass only frequency signals on the order of 20 to 30 cycles and made resonant to such desired frequency. The higher frequencies due to the sparking between the main current brushes and the rail will therefore be filtered out. The output from the band-pass filter 70 may be amplified in the low frequency amplifier 71 whose output is caused to actuate a trip circuit 72 whose output is designed to energize relay 52 after passing through a delay circuit 73. The reason for the delay circuit is that when contacts 50 span the rail ends, the detector coils are still some distance from the region of flux affected by the angle bar. The delay circuit is so adjusted that the output from trip circuit 72 will become effective to energize relay 52 after such time as is required for the coils to move to a point where the region of flux is distorted by the angle bar. At the same time a second delay circuit 74 is energized having a longer time delay than delay circuit 73, and the output from delay circuit 74 is designed to energize relay 75 to close the circuit through amplifier 28 after the coils have passed beyond the angle bar and the region of flux distortion caused by the angle bar. The adjustment of the delay circuits is tied in with the car speed. The result of this construction is shown graphically on the voltage record chart of Fig. 3B wherein it will be seen that only the voltage peak 60 caused by the rail ends is still visible while all the other high frequency voltage peaks such as 61 and 62 have been eliminated. Therefore, only the voltage drop between contacts 50 caused by the rail ends will be available for energizing relay 52 to break the circuit between the detector coils and the amplifier to render the indicating means ineffective, and for again rendering the indicating means effective after the coils have passed beyond the region of angle bar flux distortion.

Having described my invention, what I claim and desire to secure by Letters Patent, is:

1. In a rail flaw detector car adapted to travel over rails connected by joints and comprising the following elements: means for sending current through the rail, flaw detector means, an indicator adapted to be actuated by said detector means, cut-out means for rendering the detector means ineffective to actuate the indicator, potential contacts positioned in advance of the detector means and adapted to respond to the voltage variation at the joints, and means whereby the voltage drop between the contacts generated at the joints renders the cut-out means effective; characterized by the improvement which comprises means for preventing relatively high frequency voltage pulses generated between the potential contacts from rendering the cut-out means effective, said last named means comprising said contacts spaced so that the voltage pulses generated when passing over the rail ends have a relatively low frequency, and a filter interposed between the contacts and cut-out means and adapted to pass only said relatively low frequency pulses and to block out said relatively high frequency pulses.

2. In a rail flaw detector car adapted to travel over rails connected by joints and comprising the following elements: means for sending current through the rail, flaw detector means, an indicator adapted to be actuated by said detector means, cut-out means for rendering the detector means ineffective to actuate the indicator, potential contacts positioned in advance of the detector means and adapted to respond to the voltage variation at the joints, and means whereby the voltage drop between the contacts generated at the joints renders the cut-out means effective; characterized by the improvement which comprises means for preventing relatively high frequency voltage pulses generated between the potential contacts from rendering the cut-out means effective, said last named means comprising said contacts spaced so that the voltage pulses generated when passing over the rail ends have a relatively low frequency, and a filter interposed between the contacts and cut-out means and adapted to pass only said relatively low frequency pulses and to block out said relatively high frequency pulses, said filter being resonant with the low frequency pulses.

WILLIAM E. MESH.

REFERENCES CITED

The following references are of record in the file of this patent:

UNITED STATES PATENTS

| Number | Name | Date |
|---|---|---|
| 2,005,011 | Specht | June 18, 1935 |
| 2,028,486 | Zuschlag | Jan. 21, 1936 |
| 2,409,553 | Drake | Oct. 15, 1946 |
| 2,429,336 | Zuschlag | Oct. 21, 1947 |